Patented Feb. 25, 1936

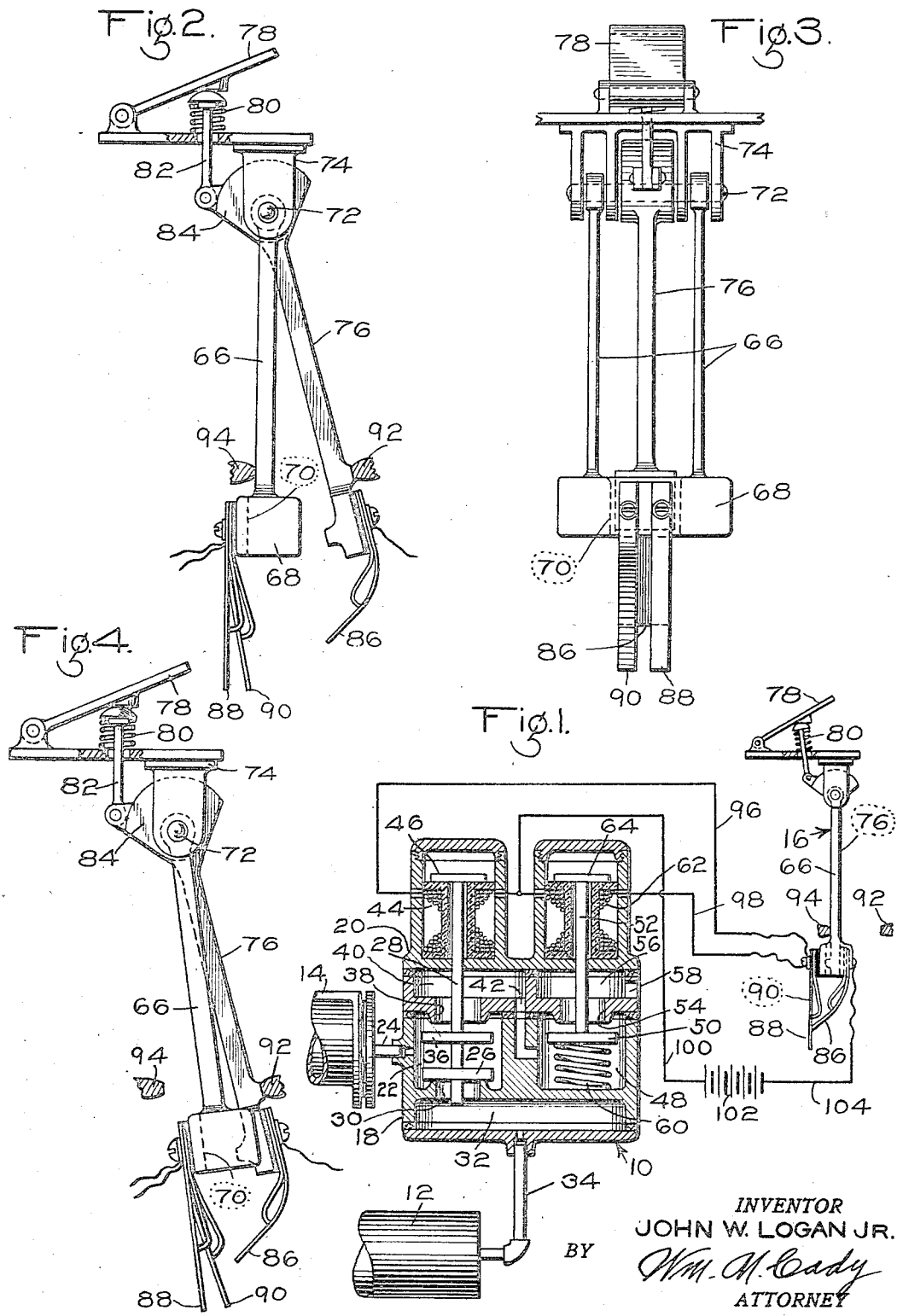

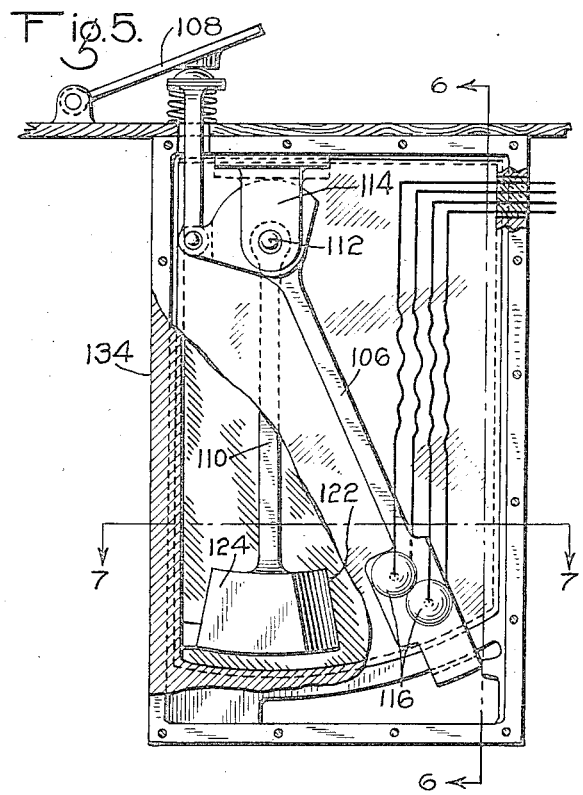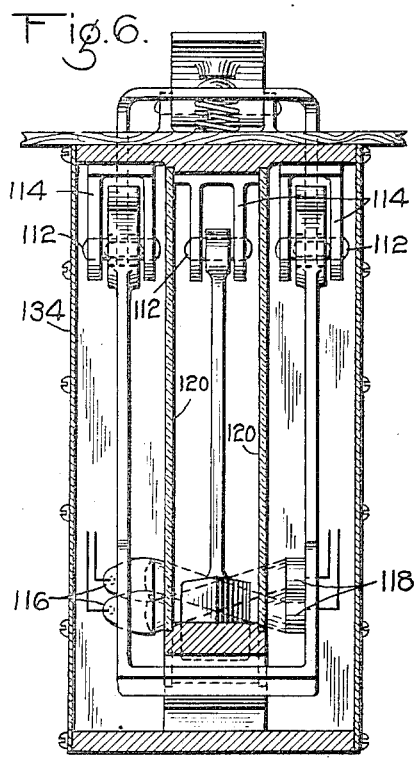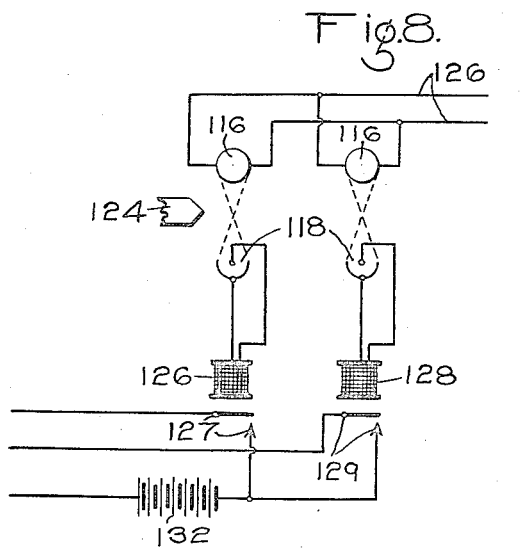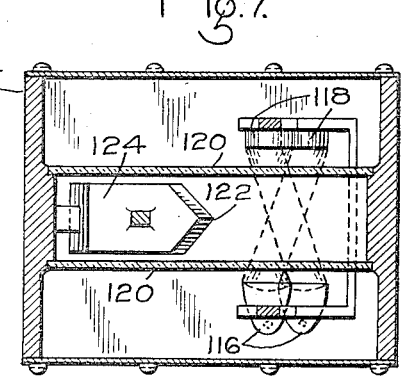

2,032,177

UNITED STATES PATENT OFFICE 2,032,177

FLUID PRESSURE BRAKE CONTROL

John W. Logan, Jr., Wilkinsburg, Pa., assignor to The Westinghouse Air Brake Company, Wilmerding, Pa., a corporation of Pennsylvania Application November 17, 1933, Serial No. 698,460

19 Claims. (Cl. 303—24)

This invention relates to vehicle brakes, and more particularly to fluid pressure brake control apparatus for regulating the braking pressure in accordance with a desired rate of retardation.

It is a fact well known to those skilled in the art that when a friction brake is applied with a given pressure the braking effect produced is less at high vehicle speeds than at low speeds, due to the coefficient of friction between friction brake parts being less at high speeds than at low speeds. If the braking pressure be such that a maximum braking effect is obtained at a high speed, then the braking pressure must be diminished as the speed of the vehicle diminishes, otherwise dangerous shocks or skidding of the wheels, or both, may result. From time to time various devices have been proposed for automatically decreasing the braking pressure as the speed of the vehicle decreases. Heretofore, these devices were designed to become operative at some one predetermined rate of retardation, and thus act to maintain some one predetermined rate of retardation, or at least to limit the maximum rate of retardation to that rate. It is, however, highly desirable to be able to select at will a desired rate of retardation, corresponding to operating conditions which an operator may readily observe at a given time or to suit the convenience of the occasion, and then have suitable means for automatically adjusting the braking pressure to maintain the preselected rate of retardation.

In accordance with this desire it is a general object of my invention to provide brake control apparatus in which provision is made for the preselection of any desired rate of retardation due to the application of the brakes over a wide range, and for the automatic adjustment of the braking pressure to maintain this preselected rate of retardation.

Another object is to provide means for varying the braking pressure to provide a desired rate of retardation due to the application of the brakes, and means operable manually for effecting an application of the brakes and at the same time determining the rate of retardation.

A further object is to provide such an apparatus in which the desired rate of retardation is selected by manually moving a single control element, the rate of retardation selected being in accordance with the degree of movement of the control element.

Other objects and advantages will be apparent as the invention is more fully described in connection with the embodiments illustrated in the attached drawings, in which, Fig. 1 is a schematic arrangement of apparatus comprising one embodiment.

Figs. 2, 3 and 4 show in detail the form of control device illustrated in Fig. 1.

Figs. 5, 6 and 7 show in detail another form of control device which may be used.

Fig. 8 illustrates schematically how this latter control device may be arranged for operation with the fluid pressure apparatus shown in Fig. 1.

Referring now to Figs. 1 to 4, I have shown for this one embodiment an arrangement comprising an electrically operated valve device 10, for controlling the supply of fluid under pressure to and its release from a brake cylinder 14, and a control device 16 for controlling operation of the valve device 10.

The valve device 10 comprises a valve section 18 and a magnet section 20. The valve section 18 has a casing defining valve chambers 22 and 48, a supply chamber 32, and chambers 40 and 56. Disposed in the valve chamber 22 is a supply valve 26 secured to a valve stem 28, and adapted to cooperate with a valve seat 30 to control the supply of fluid under pressure from the supply chamber 32, which is in constant communication with a source of fluid under pressure, as with a reservoir 12 through a pipe 34, to the valve chamber 22 and thence to the brake cylinder 14 through pipe 24. Also disposed in the valve chamber 22 is another valve 36, also secured to the valve stem 28, and adapted to cooperate with a seat 38 to control the release of fluid under pressure from the brake cylinder 14 to the chamber 40, which through passage 42 is in constant communication with the valve chamber 48, in which is disposed a release valve 50 adapted to cooperate with a seat 54 to control venting of the chamber 40, and hence the brake cylinder 14, to the atmosphere by way of chamber 56 and port 58. Release valve 50 is secured to a valve stem 52 and normally urged toward seated position by a spring 60. The valve 36 is not essential for the successful operation of this embodiment, but is in many cases preferred to prevent accidental venting of the brake cylinder should release valve 50 not seat properly.

The magnet section 20 is provided with electromagnets having windings 44 and 62. When winding 44 is energized it will attract thereto-ward armature 46, secured to the valve stem 28, to seat supply valve 26 and unseat valve 36. When winding 62 is energized it will attract theretoward armature 64 to unseat release valve 50. Thus electromagnet winding 44 controls the supply of fluid under pressure to the brake cylinder, and winding 62 controls the release therefrom.

The control device 16 comprises inertia controlled arms 66 joined at one end by a thickened portion 68, and pivotally supported in pendulum-like fashion at the other end from a pin 72 carried by a bracket 74; a manually controlled arm 76 also pivoted in pendulum fashion on pin 72 and adapted to be swung thereon by movement of a foot pedal 78, against resistance of a spring 80, through a pin bolt 82 connecting with the arm 76 through a counterweight portion 84; a spring contact 86 secured to and insulated from the lower end of arm 76; and spring contacts 88 and 90 insulated from each other and secured to and insulated from the portion 68 of arms 66, the contact 90 being adapted to engage the contact 86 ahead of contact 88 when the arms 66 and arm 76 move toward each other. The thickened portion 68 is recessed at 70 to permit arm 76 to move into coincidence with arms 66, as shown in Fig. 1.

The arm 76 may be swung through various angles by depressing the foot pedal 78. A stop 92 is provided to limit the maximum angle through which the arm may be swung. Arms 66 are swung through various angles by force of inertia, as when a vehicle is decelerating, the force of inertia acting at any given time depending upon the rate of deceleration of the vehicle. It will therefore be obvious that for the different positions in which arm 76, and hence contact 86, may be maintained by pressure on foot pedal 78, different forces of inertia (corresponding to different rates of retardation) are required to swing levers 66 through an angle great enough to cause contacts 88 and 90 to engage contact 86. The object of these observations will more fully hereinafter appear. A stop 94 is provided to prevent swing of the arms in a clockwise direction.

Contact 90 is connected to one terminal of electromagnet winding 44 by conductor 96, and contact 88 is connected to one terminal of electromagnet winding 62 by conductor 98. The other terminals of the two windings are connected by conductor 100 to a source of current supply, as a battery 102, which is in turn connected to contact 86 by conductor 104. Thus as contact 86 engages contact 90 winding 44 is energized, and as it engages contact 88 winding 62 is energized.

In operation, the embodiment described is arranged on a vehicle so that when the vehicle is decelerating in speed the force of inertia acts to swing arms 66 in a counterclockwise direction, i. e. to the right. When the vehicle is at rest or traveling at a constant rate of speed on a level trackway, and foot pedal 78 is not depressed, arms 66 and arm 76 are held in coincident position, as shown in Fig. 1, by action of spring 80. Contact 86 is therefore in engagement with both contacts 88 and 90, the latter being sprung back in alignment with the other by force of the contact 86. Windings 44 and 62 are thus energized causing valve 26 to be seated and valves 36 and 50 to be unseated. The supply of fluid under pressure to brake cylinder 14 is therefore cut off and the brake cylinder is vented to the atmosphere.

When it is desired to effect an application of the brakes and produce retardation of the vehicle at a desired rate, the foot pedal 78 is depressed an amount in accordance with the desired rate of retardation. If for example, the maximum rate of retardation is desired the foot pedal is depressed until arm 76 engages stop 92, as shown in Fig. 2. As arm 76 moves away from arms 66, contact 86 moves out of engagement with contact 88 before disengaging from contact 90, thus deenergizing winding 62 and permitting release valve 50 to close before winding 44 is deenergized and supply valve 26 is unseated. Thereafter fluid under pressure will flow from reservoir 12 past the unseated valve 26 to brake cylinder 14, thus effecting an application of the brakes.

As the vehicle decelerates, due to application of the brakes, the force of inertia causes the arms 66 to swing to the right, as shown in Fig. 4. Assuming that the rate of retardation is sufficient to just cause engagement between contacts 86 and 90, but not between 86 and 88, winding 44 will be energized, seating valve 26 and unseating valve 36, thereby cutting off the supply of fluid under pressure to the brake cylinder 14 and causing the brakes to be "lapped" since valve 50 is still seated. If the rate of retardation should increase, as by an increase in the coefficient of friction, then arms 66 move further to the right, causing contacts 86 and 88 to engage. Winding 62 will then be energized, unseating valve 50 and venting brake cylinder 14 to the atmosphere past unseated valve 36, through passage 42, past unseated valve 50 and through port 58. The braking pressure will therefore diminish and the rate of retardation of the vehicle will likewise diminish to the point where arms 66 move far enough to the left to disengage contacts 86 and 88. When this happens winding 62 will be deenergized and venting of the brake cylinder thereby ceases. If the rate of retardation should further diminish, then contacts 86 and 90 disengage and winding 44 will be deenergized, again permitting fluid under pressure to be supplied to the brake cylinder. If due to increased braking pressure, or to increasing coefficient of friction of the brake parts, the rate of retardation increases, arms 66 will again swing to the right. It will therefore be obvious that in order to maintain the selected rate of retardation, as the maximum rate selected for this example, the arms 66 will move back and forth, according to variations in the rate of retardation, to operate the valve device 10 to automatically control the supply of fluid under pressure to the brake cylinder, to adjust the braking pressure as required to maintain the desired retardation rate. It will be further apparent that by depressing foot pedal 78 different distances, and thereby positioning arm 76 in different positions, any rate of retardation up to the maximum may be maintained.

Since the arms 66 respond to the rate of retardation, whether the rate of retardation is varied by increased or decreased braking pressure, or by increasing or decreasing coefficient of friction between braking parts, the functioning of the apparatus is always to maintain a preselected rate of retardation, and no "compensating" need be done by the operator of the foot pedal for variations in the coefficient of friction. It is, however, always possible for the operator to vary the desired rate of retardation as often as and when he pleases, by simply varying the pressure exerted on the foot pedal. Further, regardless of the amount the operator depresses the foot pedal, in selecting a desired rate of retardation, the brakes are initially applied with maximum braking pressure and thereafter the device functions automatically to adjust the braking pressure to effect the selected rate of retardation.

While the matter of selecting a maximum rate of retardation as a limit is an arbitrary one, the rate usually selected is that corresponding to the maximum braking pressure which may be applied for a given set of vehicle and track conditions and not cause wheel skidding.

In the embodiment thus far described the arms 66 and 76 are required to operate contacts, and thus do mechanical work in controlling application of the brakes. In Figs. 5 to 8 I have illustrated a control device for performing the same function as that heretofore described, but which is not required to do mechanical work. As shown, I provide a U-shaped arm 106, manually operated by a foot pedal 108 in the manner before described, and a pendulum 110 operated by force of inertia, both arm 106 and pendulum 110 being suspended on pins 112 carried by brackets 114. The U-shaped arm 106 carries light producing elements 116 on one leg and light responsive elements 118, as photo-electric cells or the like, on the other leg, each light responsive element 118 being in alignment with a light producing element 116 so as to have impinged thereon a light beam produced by the latter element. The light producing elements 116 are adapted to produce light beams having focal points midway between the producing and responsive elements 116 and 118. The pendulum 110 is enclosed in a transparent case 120, of glass or the like, through which the aforementioned light beams may pass, and the pendulum is positioned between the legs of the arm 106 in a manner such that as it swings or passes in between the legs the knife edge 122 intersects the light beams successively at their focal points and the beams are interrupted so long as the body 124 of the arm 106 remains in the light stream.

The light producing elements 116 are connected to a suitable source of current supply (not shown) by conductors 126, and the light responsive elements 118 are connected to relays 126 and 128, respectively, controlling the opening and closing of contacts 127 and 129, respectively. Contacts 127 and 129 are intended to function as did contacts 86, 88 and 90 heretofore described, for controlling the operation of the valve device 10. Contacts 127 are then connected to winding 44 and battery 132, and contacts 129 are connected to winding 62 and battery 132.

The control device may be enclosed in a casing 134 to prevent dirt and foreign matter from interfering with its operation.

The operation of the control device is carried out the same as before. When the foot pedal 108 is not depressed and the vehicle is not decelerating, arms 106 and 110 are in coincident position, whereupon the light beams produced by the elements 116 are wholly interrupted by the body 124. Relays 126 and 128 are therefore deenergized and contacts 127 and 129 are thus closed, energizing both windings 44 and 62, thereby permitting the brakes to be released.

When it is desired to effect an application of the brakes, foot pedal 108 is depressed according to the desired rate of retardation, whereupon arm 106 is moved to the right accordingly, such for example as to the position shown in Fig. 5. The light beams then impinge upon the elements 118 and because of the characteristics of these elements, current flows to the relays 126 and 128, energizing them and thus causing contacts 127 and 129 to be opened. Windings 44 and 62 are then deenergized to effect an application of the brakes in the manner already described.

From what has been said in connection with this and the control device heretofore described, it will be obvious that the arms 106 and 110 act in a manner similar to the arms 66 and 76, to control the braking pressure to maintain a desired rate of retardation, and that similar results are obtained with each. By spacing the elements 116 and 118 as shown, so that the light beams are interrupted successively and not simultaneously, the same results are obtained as with the spaced contacts 88 and 90. It is, therefore, not deemed necessary to describe in detail the full operation of this latter control device.

While I have in the modification just referred to disclosed a brake system embodying a form of the invention employing photo-electric means, it is to be here noted that a similar brake system employing similar photo-electric means forms the subject matter of my copending application Serial No. 758,583, filed December 21, 1934.

The maximum braking pressure with which the brakes on railway vehicles can be applied, to cause the maximum rate of retardation due to braking, is limited to the maximum adhesion between wheels and rails. All other things being equal, this adhesion is less on grades than on level trackways, due to the vehicle weight bearing on the track being less on grades than on level trackways, the adhesion becoming less as the steepness of the grade increases.

It follows, therefore, that the maximum possible rate of retardation on grades due to braking will be less than that possible on level trackways, in proportion to the ratio of adhesion between the two. One of the features of my invention, as a little thought will show, is that the inertia operated arm operates to effect a braking pressure on grades which bears a relation to the braking pressure effected on level trackways, for the same position of the manually operated arm, as does the adhesion between the two conditions, other things being equal. Or stated differently, the control device embodying my invention utilizes the adhesion as effectively on grades as on level trackways, to maintain a desired rate of retardation.

While several illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a brake apparatus, a retardation rate controller device comprising a pair of mutually pivoted elements adapted to have positions of coincidence and non-coincidence, one of said elements being manually positionable and the other being positionable by force of inertia, and means whereby for positions of non-coincidence an application of the brakes is effected and for positions of coincidence a release of the brakes is effected.

2. In a brake apparatus, a retardation controller device comprising a pair of mutually pivoted elements adapted to have position of coincidence and non-coincidence, one of said elements being manually positionable and the other being positionable by force of inertia, and means whereby for certain positions of non-coincidence an application of the brakes is effected and for the other positions of non-coincidence a lapping of the brakes is effected.

3. In a fluid pressure brake system, the combination with a brake cylinder, and electrically operated valve means for controlling the supply of fluid under pressure to and its release from said brake cylinder, of independently movable and mutually pivoted elements, one of said elements being manually positionable in accordance with a desired rate of retardation and the other of said elements being movable theretoward by force of inertia, and contacts carried by said elements for controlling said electrically operated valve means.

4. In a vehicle brake system, the combination with brake means, of a body adapted to be manually movable, a second body adapted to be moved according to the rate of retardation of the vehicle, a control element for controlling application of the brakes, means for moving said first body in accordance with the movement of said control element, contacts adapted to be engaged and disengaged by movement of said two bodies, and means controlled by said contacts for controlling said brake means.

5. In a vehicle brake system, the combination with a brake means, of a control element having a release position and movable to different application positions, a pair of contacts adapted to be in engagement when said control element is in release position, means for actuating one of said contacts away from the other of said contacts to a degree in accordance with the degree of movement of said control element, means responsive to separation of said contacts for effecting operation of said brake means, and means operated according to the rate of retardation of the vehicle for causing said contacts to engage.

6. In a vehicle brake system, the combination with a brake device, of normally energized electroresponsive means for controlling operation of said device, a plurality of contacts for controlling operation of said electroresponsive means, a control element for controlling applications of the brakes according to the degree of movement of said element, means responsive to a movement of said element for operating said contacts to deenergize said electroresponsive means, and means operated according to the rate of retardation of said vehicle for operating said contacts to energize said electroresponsive means.

7. In a vehicle brake system, the combination with a brake cylinder, of electrically operated valve means for controlling the supply of fluid under pressure to and its release from said brake cylinder, a pair of bodies adapted to have biased positions, one of said bodies being manually movable and the other being movable according to the rate of retardation, a plurality of contacts carried by said bodies, a contact carried by said manually movable body being adapted to be in engagement with the contacts carried by the other body when both bodies are in said biased positions, means for moving said manually movable body away from the other of said bodies, whereby said contact on said moved body is sequentially disengaged from said contacts on said other body, and means whereby disengagement of said moved contact from one of said other contacts causes one operation of said electrically operated valve means and disengagement of said moved contact from all of said other contacts causes another operation of said electrically operated valve means, said other body being subsequently movable by inertia to reengage said contacts.

8. In a fluid pressure brake system, the combination with a brake cylinder, of a release magnet valve device and an application magnet valve device, for controlling the supply of fluid under pressure to and its release from said brake cylinder, a manually movable body, an inertia operated body, contacts carried by said bodies and adapted to be in engagement for one position of said bodies, circuits connecting said contacts and said magnet valve devices to a source of current supply, said contacts being arranged such that one movement of said manually movable body with respect to said inertia operated body effects operation of said release magnet valve device and another movement of said manually movable body effects operation of said application magnet valve device.

9. In a fluid pressure brake system, the combination with a brake cylinder, of an electrically operated release valve device, an electrically operated application valve device, independently movable and mutually pivoted elements, one of said elements being manually positionable away from the other in accordance with a desired rate of retardation and the other of said elements being movable theretoward by force of inertia, and contacts carried by said elements for controlling said valve devices, said contacts being arranged such that for one movement of one of said elements relative to the other one of said valve devices is operated and for another movement both of said valve devices are operated.

10. In a fluid pressure brake system, the combination with a brake cylinder, of a release magnet valve device, an application magnet valve device, a pair of independently movable and mutually pivoted elements, said elements being adapted to have a position of coincidence and different positions of noncoincidence, means urging said elements toward said position of coincidence, and means for urging said elements to different positions of noncoincidence, contacts carried by said elements and adapted to be in engagement when said elements are in said position of coincidence and to be sequentially disengaged when said elements are urged to positions of noncoincidence, to first effect operation of said release magnet valve device and to subsequently effect operation of said application magnet valve device.

11. In a vehicle brake system, the combination with a brake cylinder, of an electrically operated valve device for controlling the supply of fluid under pressure to and its release from said brake cylinder, an element positionable manually according to a desired rate of retardation, means associated with said element for establishing a beam of light, means responsive to said beam of light for effecting operation of said electrically operated valve device, and an element operated according to the rate of retardation of said vehicle for interrupting said beam of light.

12. In a vehicle brake system, the combination with a brake cylinder, of a pair of movable bodies having biased positions in close proximity, one of said bodies being manually movable and the other being movable by force of inertia, means responsive to movement of said manually movable body away from the other for effecting a supply of fluid under pressure to said brake cylinder, means responsive to movement of said inertia moved body toward the other for lapping the supply of fluid under pressure to said brake cylinder, and means rendered operable when said bodies move together for effecting a release of fluid under pressure from said brake cylinder.

13. In a fluid pressure brake system, the combination with a brake cylinder, of a pair of mutually pivoted and independently operable bodies, one of said bodies being adapted to be manually positionable away from the other of said bodies in accordance with a desired rate of retardation, contacts carried by each of said bodies, electroresponsive means for controlling the supply of fluid under pressure to and its release from said brake cylinder, and circuits connecting said electroresponsive means to said contacts and to a source of current supply, said contacts being arranged such that said movable body may be moved back and forth through short distances to effect different degrees of fluid under pressure in said brake cylinder.

14. In a vehicle brake system, in combination, brake means, a movable member, an inertia operated device adapted to be operated according to the rate of retardation of the vehicle, a control element for controlling application of the brakes, means for effecting movement of said movable member in accordance with the movement of said control element, circuit controlling means adapted to be operated by said inertia device according to position of said movable member, and means responsive to operation of said circuit controlling means for controlling said brake means.

15. In a vehicle brake system, in combination, brake means, a control element for controlling applications of the brakes, an inertia device responsive to the retardation of the vehicle, contacts adapted to be engaged and disengaged by movement of said inertia device, means controlled by said contacts for controlling said brake means, means for adjusting the operation of said contacts by said inertia device in accordance with movement of said control element whereby said inertia device operates said contacts at different rates of retardation, and means responsive to initial adjustment of said contacts for effecting an application of said brake means.

16. In a vehicle brake system, in combination, brake means, a control element having a release position and movable to different application positions, contacts adapted to be in engagement when said control element is in release position, means for separating said contacts to a degree in accordance with the degree of movement of said control element, means responsive to separation of said contacts for effecting operation of said brake means, and means operated according to the rate of retardation of the vehicle for causing a subsequent engagement of said contacts to effect a release of said brake means.

17. In a vehicle brake system, in combination, a brake cylinder, a pair of normally engaging elements, means for manually separating said elements to a degree in accordance with a desired rate of retardation, means responsive to separation of said elements for effecting a supply of fluid under pressure to said brake cylinder, and means operable to subsequently cause of said elements to move toward the other of said elements at said desired rate of retardation to effect a release of fluid under pressure from the brake cylinder.

18. In a vehicle brake system, in combination, brake means, a first movable body, a second movable body adapted to be moved according to the rate of retardation of the vehicle, a control element for controlling applications of the brakes, means for moving said first body in accordance with the movement of said control element, photoelectric means adapted to be operated by movement of said two bodies, and means controlled by said photo-electric means for controlling said brake means.

19. In a vehicle brake apparatus, in combination, brake means, light responsive means responsive to variations in the quantity of light supplied thereto and operative to control said brake means, and means responsive to inertia and operated to vary the quantity of light supplied to said light responsive means.

JOHN W. LOGAN, Jr.